March 13, 1973 L. J. DIETTRICH 3,720,210

INDWELLING CATHETER DEVICE

Filed March 3, 1971

INVENTOR
Lambert John Diettrich

BY Barry L. Clark

His Att'y

United States Patent Office 3,720,210
Patented Mar. 13, 1973

3,720,210
INDWELLING CATHETER DEVICE
Lambert John Diettrich, Glencoe, Ill., assignor to Baxter Laboratories, Inc., Morton Grove, Ill.
Filed Mar. 3, 1971, Ser. No. 120,418
Int. Cl. A61m 5/00, 25/00
U.S. Cl. 128—214.4                    10 Claims

ABSTRACT OF THE DISCLOSURE

An indwelling catheter device is provided for use in an intravenous catheter placement unit or infusion set to permit the introduction or withdrawal of liquids from a human body. The catheter device includes an elongated flexible tube section of a low friction material, preferably fluorinated ethylene propylene polymers or tetrafluoroethylene polymers, having a tubular, preferably thermoplastic, collar member mounted thereon with an interference fit adjacent an enlarged flange of the elongated flexible tube section. A hub element of a different higher friction material, such as polyethylene, is insert molded over and around the tubular collar member and enlarged integral flange of the elongated flexible tube section to form a unitary catheter device. The heat of the molding operation causes a chemical bonding or fusing of the material of the hub to the material of the collar so as to provide a fluid tight seal between the hub and catheter tube.

BACKGROUND OF THE INVENTION

Before the present invention, many attempts have been made in the catheter art to provide a strong and leakproof catheter construction where different materials for the catheter section and hub element are used. It has been found desirable to employ a strong, flexible, low friction material which can also be made radiopaque for the catheter section since damage to skin tissues is minimized while comfort to the patient is enhanced. On the other hand, an easily molded, higher friction material is preferred for the hub element to enable syringes and other apparatus to be securely connected thereto. Particularly desirable materials for the catheter tubing and the hub are fluorinated ethylene propylene polymers or polytetrafluoroethylene (hereinafter referred to by the trademark Teflon) and polyethylene respectively. However, the low friction natur of polytetrafluoroethylene makes it relatively impossible to bond other materials to it or to mold them around it without presenting the possibility for leaking of fluids between the materials.

At present there are several techniques employed for securing catheter sections and hub elements made of different materials to each other. One commonly used approach, as shown in U.S. Pat. No. 3,352,306, is to join the catheter section within the hub element by the use of an epoxy compound. However, since epoxy joining of Teflon is not too satisfactory and presents the possibility that excess epoxy could be exposed to fluids passing through the catheter whose reaction with epoxy has not been thoroughly determined, it is preferable to insure that epoxy be kept out of the fluid path. Another technique is shown in U.S. Pat. No. 3,469,579 where a headed catheter section is mounted within a complementary-shaped recess of a hub element, and then heated forming dies are utilized to mechanically interlock and bond the catheter sections and hub elements to each other. While the danger of separation of the two components is lessened with this design, there is still a possibility of leakage since it is difficult to bond other materials to Teflon. Unless a chemical bond is achieved along with a mechanical interlock between catheter components, there is a possibility of leakage occurring.

SUMMARY OF THE INVENTION

The indwelling catheter device of the present invention includes an elongated flexible tube section, preferably of fluorinated ethylene propylene polymers or tetrafluoroethylene polymers, which is sold under the trademark Teflon, having a through pasageway and an enlarged integral flange adjacent one end thereof, a tubular collar member of a thermoplastic heat shrinkable material such as vinyl which is mounted over the elongated flexible tube section and mechanically bonded thereto adjacent the enlarged integral flange by an interference fit produced by heat shrinking, and an insert molded hub element of a material such as polyethylene which completely surrounds the tubular collar member and the enlarged integral flange of the elongated flexible tube section in interlocked and bonded relationship thereto. The hub element is further provided with an opening extending from one end thereof which communicates with the passageway of the elongated flexible tube section for the conveyance of fluids therethrough. The above combination of elements thus provides various mechanical interlocks as well as a chemical bond between the tubular collar section and the molded hub element caused by a partial surface melting of the collar due to the heat of the molding operation in a manner not heretofore contemplated by the prior art.

It is known from at least two prior art references that the use of a collar or sleeve element may be employed for joining or uniting two separate components to each other. In U.S. Pat. No. 3,226,463, a plastic sleeve is used for embedding a cylindrical diode element in centrally located position relative to an injection molded cylindrical housing. Also, in U.S. Pat. No. 2,949,913, a plastic sleeve and rubber collar member are joined respectively to a metal needle and a length of plastic tubing to form a hypodermic needle set. It will be apparent, however, that neither of these prior art teachings suggest the mechanical interlock and chemical bond for an indwelling catheter device as in the present invention.

Accordingly, it is an object of the present invention to retain the known advantage of indwelling catheter devices while overcoming many of the heretofore noted disadvantages.

More specifically, it is an object of the present invention to provide an improved indwelling catheter device wherein a catheter section and hub element, prefarbly formed of different materials which cannot be bonded to each other, are joined together in a strong and leakproof construction.

Another object of the present invention is to provide a mechanical interlock and chemical bond between a catheter section and hub element which overcomes the separation and leakage difficulties heretofore plaguing prior art devices.

DESCRIPTION OF THE PREFERRED EMBODIMENT

Figure 1:
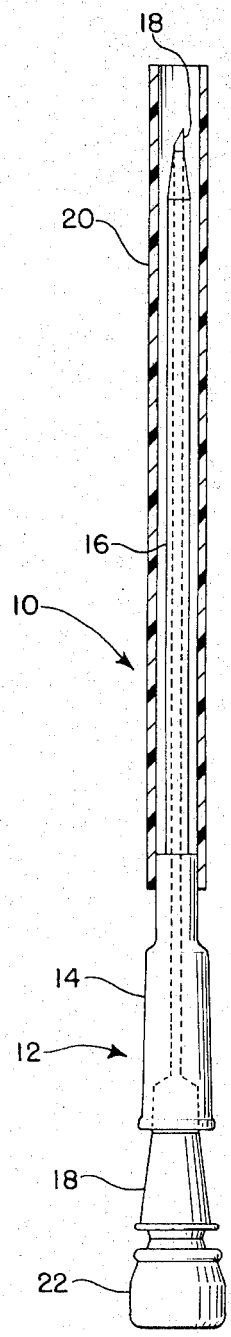
FIG. 1 is a side elevational view, partially in section, of an indwelling catheter device constructed in accordance with the teachings of the present invention, the indwelling catheter device being connected to a needle and shield or cover with which it may be associated.

In FIG. 1 of the drawings, a catheter needle assembly 10 is illustrated in generally the form that it would be used by a nurse or medical attendant. Basically, the catheter needle assembly 10 includes an indwelling catheter device 12 having a hub element 14 and an elongated flexible tubular catheter section 16, a needle 18 which extends through the hub element and catheter section 14, 16 of the indwelling catheter device 12, a shield or cover 20 which is mounted on the hub element 14 in a manner to protect the catheter section 16 and the exposed portion of the needle 18, and a plug 22 which is inserted in the open end or mount of the hub element 14.

When it is desired to use the catheter needle assembly for making a venipuncture, the cover or shield 20 and plug 22 are first removed and then the needle 18 and associated indwelling catheter device 12 are inserted into the body. The needle 18 is necessary for making the venipuncture, but once this has been achieved, the needle 18 is removed from the indwelling catheter device 12, the latter remaining in the body. In order to then withdraw or introduce fluids relative to the body, it is then necessary to connect the indwelling catheter device 12 to tubing which, in the case of introduction of fluids, extends from a parenteral solution bottle or the like (not shown). This is accomplished in a manner well known in the art, it thus being unnecessary to reiterate this medical procedure.

Figure 2:
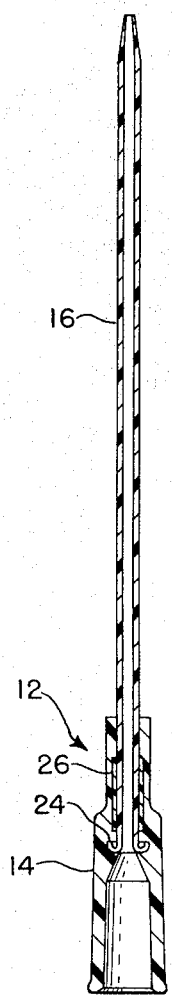
FIG. 2 is a sectional view of the indwelling catheter device of the present invention.
Figure 3:
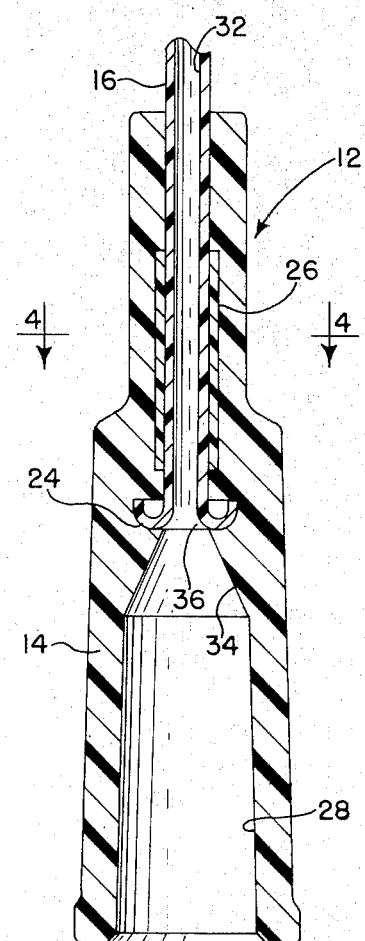
FIG. 3 is an enlarged fragmentary sectional view of the herein disclosed indwelling catheter device.
Figure 4:
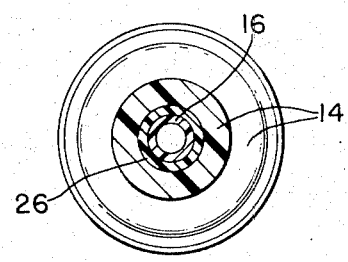
FIG. 4 is an enlarged sectional view taken along lines 4—4 of FIG. 3.

The present invention is concerned specifically with the indwelling catheter device 12 which is best shown in FIGS. 2-4 of the drawing. As previously indicated, it is generally desirable to form the various components of the indwelling catheter device 12 from different material. It will be appreciated that the tubular catheter section 16, because it is designed to remain in the body during the introduction or withdrawal of liquids, is preferably made from a strong, very low friction material which is fairly flexible so as to minimize damage to the skin tissue as well as associated pain and discomfort to the patient, rigid enough to pass through the patient's skin, and capable of being made radiopaque so that it can be traced if accidently lost in a vein. At the same time, the material from which the tubular catheter section 16 is formed should be inert to prevent infection or adverse reactions to the body. The hub element 14, on the other hand, is preferably formed from a material such as polyethylene which is easily molded, relatively inert, and capable of frictionally being locked to syringes and other devices to which the indwelling catheter device 12 is to be positively connected in a contemplated medical procedure.

Although Teflon and polyethylene can be advantageously employed for the catheter sections and hub elements 16, 14 respectively in indwelling catheter devices 12, it has been found difficult to effectively join or unite catheter sections and hub elements made from these two materials, for example, to provide a strong and leakproof indwelling catheter device.

In order to alleviate the aforementioned difficulties, the indwelling catheter device 12 of the present invention provides a mechanical interlock and chemical bond between various components thereof to achieve a strong and leakproof unitary construction in a manner heretofore unattainable by prior art devices. In order to achieve this, the indwelling catheter device 12 is constructed as follows: The elongated flexible tube section 16, preferably made from a material such as Teflon, is provided adjacent one end thereof with an enlarged integral flange 24. It will be noted that the flange 24 first extends outwardly from the tube section 16 and then is reversely bent relative to the tube section 16 for purposes which will be presently described. A tubular collar member 26, preferably made from a synthetic rubber material or a thermoplastic material such as vinyl, is mounted over the elongated flexible tube section 16 adjacent the enlarged integral flange 24 thereof. The clearance between the elongated flexible tubular section 16 and the tubular collar member 26, on the outside and inside diameters respectively thereof, is preferably such that a fluid-tight interference fit will be obtained in the finished product when the tubular collar member 26 is mounted over the elongated flexible tube section 16 and located adjacent the enlarged integral flange 24 of the elongated flexible tube section 16. At this point, it may be desirable to heat shrink the thermoplastic material or synthetic rubber material from which the tubular collar member 26 is made to position the tubular collar member 26 relative to the elongated flexible tube section 16 prior to the operation of molding the hub 14.

When the tubular collar member 26 has thus been mounted on the elongated flexible tube section 16 adjacent the enlarged integral flange 24 thereof, preferably with a slight axial spacing between the tubular collar member 26 and the enlarged integral flange 24, the hub element 14 can then be formed on the indwelling catheter device 12. This is preferably accomplished by the technique of insert molding the hub element 14 over and around the elongated flexible tube section, in the vicinity of the mounted tubular collar member 26 and the enlarged integral flange 24 of the elongated flexible tube section 16, to securely unite the components of the indwelling catheter device 12 in a unitary construction.

It has been found that an indwelling catheter device 12 so formed provides various mechanical interlocks as well as a chemical bond between certain components or elements thereof to provide a strong and leakproof unitary construction. Specifically, it will be noted that the thermoplastic material from which the hub element 14 is formed flows into and about the enlarged integral flange 24 of the elongated flexible tube section 16 as well as about the tubular collar member 26 and a portion of the elongated flexible tube section 16 as is best illustrated in FIG. 3 of the drawing. The enlarged integral flange 24, together with the tubular collar member 26 which is secured to the elongated flexible tube section 16, thus combine to mechanically prevent any relative movement between the hub element 14 and elongated flexible tube section 16. The danger of separation of these parts or components has been obviated or at least greatly minimized with the present construction.

The hub element 14 and elongated flexible tube section 16 are mechanically bonded together in fluid tight relation due to the tight shrink fit of the collar 26 to the tube 16. In addition to the mechanical bonding that takes place between the tubular collar member 26 and the elongated flexible tube section 16, it is also possible to effect a chemical bond between the hub element 14 and the tubular collar member 26. Fusing can also be achieved since the heat of the molten plastic of the hub during molding will partially melt the surface of the collar if the collar is made of thermoplastic material. Various materials can be used for the collar member 26 which can serve to provide a chemical bond or fusing between the hub element 14 and the tubular collar member 26. One of these is vinyl. Other materials which will tightly engage the tube section 16 and not be destroyed by the heat of the molding operation could also be used. By the present invention, it thus becomes possible to mechanically interlock and chemically bond or fuse a hub element 14 made from a thermoplastic material such as polyethylene to an elongated flexible tube section 16 made from a material such as Teflon by connecting these elements to a tubular collar member 26 made from a synthetic rubber material or a thermoplastic material such as vinyl. Mechanical interlocking of these elements is further enhanced by the use of an enlarged integral flange 24 on the elongated flexible tube section 16 which is embedded in the hub element 14 during the insert molding operation. It will be further appreciated that the preferred configuration of the enlarged integral flange 24 and its spacing from the tubular collar 26 provides a tortuous path for a liquid that might attempt to seep through these elements.

In order to provide for the conveyance of fluids between the hub element 14 and elongated flexible tube section 16, it will be noted that the hub element 14 has an opening 28 extending from one end 30 thereof which communicates with the through passageway 32 provided in the elongated flexible tube section 16. The opening 28 includes an inner tapered wall area 34 which merges with an inner tapered wall portion 36 provided at the open mouth of the elongated flexible tube section 16 in the vicinity of the enlarged integral flange 24 thereof. With this construction, the opening 28 in the hub element 14 and the through passageway 32 of the elongated flexible tube section 16 combine to provide a communicating channel by which fluids may be introduced or withdrawn from the body.

In addition to the advantages which have been described above in connection with the herein disclosed indwelling catheter device 12, other advantageous features may be employed. Where Teflon materials is used for the elongated flexible tube section 16, as in the preferred construction of the present invention, it is possible to make the elongated flexible tube section 16 radiopaque, by techniques well known in the art, so that it is possible to trace the elongated flexible tube section 16 by X-ray equipment in the unlikely event that separation takes place between the hub element 14 and the elongated flexible tube section 16 and the tube section moves through a vein. Furthermore, the thermoplastic material from which the hub element 14 is formed can be made transparent while the tubular collar member 26 is colored. This permits color coding for identification of various sizes within a product line while keeping the coloring material, which may react adversely to fluids, out of the fluid path.

It will now becomes apparent that the indwelling catheter device of the present invention provides a strong and leakproof unitary construction through the components or elements which are constructed and arranged to provide a mechanical interlock and chemical bond or fusing therebetween. The indwelling catheter device can also be constructed to assure the selection of the proper size prior to use while enabling X-ray equipment to monitor the location thereof in the body in the event of accidental separation of the components from each other.

I claim:

1. An indwelling catheter device comprising an elongated, flexible tube section of a first material having a through passageway and an enlarged integral flange adjacent one end thereof, said enlarged integral flange comprising a portion of said flexible tube section which first extends outwardly from and then is reversely bent relative to the remainder of said flexible tube section, a tubular collar member mounted over said elongated flexible tube section and in fluid-tight relation thereto adjacent said enlarged integral flange, and a molded hub element of a second material not easily bonded to the tube section material completely surrounding the tubular collar member and the enlarged integral flange of said elongated flexible tube section in interlocked and bonded relationship thereto, said hub element having an opening extending from one end thereof which communicates with the passageway of the elongated flexible tube section for the conveyance of fluids therethrough.

2. The device as set forth in claim 1, wherein said elongated flexible tube section includes an inner tapered wall portion adjacent the enlarged integral flange, said inner tapered wall portion forming an extension of a tapered wall area of said opening within the hub element.

3. The device as set forth in claim 1 wherein the tubular collar member is slightly axially spaced from said enlarged integral flange.

4. The device as claimed in claim 1 wherein said elongated flexible tube section is made from material selected from the group consisting of fluorinated ethylene propylene polymers and tetrafluoroethylene polymers.

5. The device as claimed in claim 4 wherein said elongated flexible tube section is radiopaque.

6. The device as claimed in claim 4 wherein said tubular collar member is made from a material selected from the group consisting of thermoplastic and synthetic rubber materials which permit heat shrinking and bonding thereof to said elongated flexible tube section.

7. The device as claimed in claim 6 wherein said hub element is made from a thermoplastic material which can be insert molded over said tubular collar member and said elongated flexible tube section.

8. The device as claimed in claim 7 wherein said thermoplastic material is polyethylene.

9. The device as claimed in claim 1 wherein said hub element is transparent while said tubular collar member is colored.

10. The device as claimed in claim 7 wherein the contacting surface portions of said tubular collar member and of said hub members are fused together.

References Cited

UNITED STATES PATENTS

| 3,469,579 | 9/1969 | Hubert | 128—214.4 |
| 2,938,238 | 5/1960 | Gewecke et al. | 128—214 R X |
| 2,689,563 | 9/1954 | Huber | 128—214 R |

FOREIGN PATENTS

| 1,125,735 | 7/1956 | France | 128—348 |

DALTON L. TRULUCK, Primary Examiner

U.S. Cl. X.R.

128—348